US007199207B2

(12) United States Patent
Gruenewaelder et al.

(10) Patent No.: US 7,199,207 B2
(45) Date of Patent: Apr. 3, 2007

(54) NEUTRAL-COLOURED 1K POLYURETHANE ADHESIVE

(75) Inventors: Bernhard Gruenewaelder, Hilden (DE); Werner Haller, Erkrath (DE); Birgit Ness, Langenfeld (DE); Thomas Empt, Viersen (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/988,405

(22) Filed: Nov. 12, 2004

(65) Prior Publication Data

US 2005/0137377 A1 Jun. 23, 2005

Related U.S. Application Data

(63) Continuation of application No. PCT/EP03/01018, filed on Feb. 3, 2003.

(30) Foreign Application Priority Data

Feb. 8, 2002 (DE) ................. 102 05 340

(51) Int. Cl.
*C08G 18/12* (2006.01)
*C08G 18/32* (2006.01)
*C08G 18/76* (2006.01)
*C07C 269/02* (2006.01)
*C07C 271/26* (2006.01)

(52) U.S. Cl. .............. 528/59; 252/182.22; 528/67; 528/76; 528/77; 528/85; 528/905; 560/25; 560/26; 560/358; 560/359

(58) Field of Classification Search ........... 252/182.22; 528/59, 67, 76, 85, 905, 77; 560/25, 26, 560/358, 359
See application file for complete search history.

(56) References Cited

U.S. PATENT DOCUMENTS

| | | | |
|---|---|---|---|
| 4,038,239 A | | 7/1977 | Coyner et al. |
| 4,297,444 A | | 10/1981 | Gilbert et al. |
| 4,321,333 A | * | 3/1982 | Alberino et al. ............ 521/159 |
| 5,070,114 A | * | 12/1991 | Watts et al. ................. 521/159 |
| 5,142,013 A | | 8/1992 | Cassidy et al. |
| 5,231,159 A | | 7/1993 | Patterson et al. |
| 5,350,778 A | * | 9/1994 | Steppan et al. ............ 521/159 |
| 5,530,085 A | * | 6/1996 | Giorgini ....................... 528/59 |
| 5,532,403 A | * | 7/1996 | Narayan et al. ............. 560/26 |
| 5,539,009 A | * | 7/1996 | Narayan et al. ............ 521/159 |
| 5,539,010 A | * | 7/1996 | Narayan et al. ............ 521/159 |
| 5,585,452 A | * | 12/1996 | Hurley et al. ................. 528/67 |
| 5,672,635 A | * | 9/1997 | Narayan et al. ............ 521/159 |
| 6,262,139 B1 | * | 7/2001 | Narayan et al. ............ 521/159 |
| 6,797,798 B2 | * | 9/2004 | Johnston ....................... 528/60 |
| 2003/0121786 A1 | | 7/2003 | Fieberg et al. | |

FOREIGN PATENT DOCUMENTS

| | | |
|---|---|---|
| CA | 2 154 243 | 1/1996 |
| DE | 42 36 562 A1 | 5/1994 |
| DE | 44 26 130 A1 | 1/1996 |
| DE | 199 35 489 A1 | 2/2001 |
| DE | 199 58 488 A1 | 6/2001 |
| EP | 0 568 425 A1 | 11/1993 |
| EP | 0 731 119 A2 | 9/1996 |
| EP | 0 746 577 B1 | 8/1998 |
| WO | WO 97/10274 A1 | 3/1997 |
| WO | WO 02/26848 A2 | 4/2002 |

OTHER PUBLICATIONS

"Plastics—Resins in the liquid state or as emulsions or dispersions—Determination of apparent viscosity by the Brookfield Test Method", (DIN EN ISO 2555), DIN Deutsches fur Normung e.V., pp. 1-9 (Jan. 2000).
"Adhesives—Determination of isocyanate content", (DIN EN 1242), DIN Deutsches Institut fur Normung e.V., pp. 1-4 (May 1998).
"Classifications of thermosetting wood adhesives for non-structural applications", (DIN EN 12765), DIN Deutsches Institut fur Normung e.V., pp. 1-5 (Sep. 2001).
"Test methods for wood adhesives for non-structural applications; determination of tensile shear strength of tap joints", (DIN EN 205) DIN Deutsches Institut fur Normung e.V., pp. 1-5 (Oct. 1991).
Voranol CP 450 Polyol, Product Information, Form No. 109-51041-E-1000MJ (Dow Chemical Company).
Lupranol® 1000 Technical Data Sheet (Elastogran GmbH, BASF Group).
Molecular Weight of Carbopol® and Pemulen® Polymers, Noveon, Inc., Technical Data Sheet No. 222 (Rev. 12/99).

* cited by examiner

*Primary Examiner*—Rabon Sergent
(74) *Attorney, Agent, or Firm*—Glenn E. J. Murphy

(57) ABSTRACT

A polyurethane prepolymer obtainable by reacting at least one aromatic polyisocyanate having symmetrical substitution of NCO groups and at least one aromatic polyisocyanate having asymmetric substitution of NCO groups, the fraction of aromatic polyisocyanate having symmetrical substitution of NCO groups being higher than the fraction of polyisocyanate having asymmetric substitution of NCO groups, and at least one polyol having an OH functionality of more than 2.5 and at least one polyol having an OH functionality of less than 2.5.

9 Claims, No Drawings

NEUTRAL-COLOURED 1K POLYURETHANE ADHESIVE

CROSS REFERENCE TO RELATED APPLICATIONS

This application is continuation under 35 U.S.C. § 365(c) and 35 U.S.C. § 120 of international application PCT/EP03/01018, filed Feb. 3, 2003. This application also claims priority under 35 U.S.C. § 119 of DE 102 05 340.5, filed Feb. 8, 2002, which is incorporated herein by reference in its entirety.

BACKGROUND OF THE INVENTION

The present invention relates to a polyurethane prepolymer which is preparable from at least one polyisocyanate substituted symmetrically in respect of NCO groups and at least one polyisocyanate substituted asymmetrically in terms of NCO groups, at least one polyol having an OH functionality of more than 2.5 and at least one polyol having an OH functionality of less than 2.5, to a process for preparing such a polyurethane prepolymer, to an adhesive comprising at least one such polyurethane prepolymer, and to its use.

One-component polyurethane adhesives (1K PU adhesives) are enjoying ever more frequent application, since they have considerable advantages over polyvinyl acetate dispersions (PVAc dispersions) in respect of heat resistance and water resistance. Adhesives of this kind, which are used very often in the field of wood bonding, have the drawback that, because of their intrinsic color, the glue line is apparent. In the field of the furniture industry and of interior outfitting, and also in the industrial sector, where certain light-colored fashion woods such as limba, ash or maple, for example, are being employed with increasing frequency, there is a call for adhesives with which the glue line has a zero or only very low visibility.

Particularly affected by this are all multi-layer glued constructions where, for the shaped parts to be produced, a large number of laminates are glued together, and where glue lines which are apparent produce severe disruption to the overall visual impression. Although adhesives based on polyvinyl acetate, for example, are known for their color neutrality, their use may be restricted for a variety of reasons.

Where, for example, high heat resistance or water resistance in the bond is a requirement, the last-mentioned adhesives are of only limited suitability, and are not suitable for every requirement. PVAc dispersions in particular, on account of their high water content of approximately 50% or more, cannot generally be used for multi-layer glued constructions, since the water fraction retards drying for an uneconomically long time and often, owing to the thermoplastic properties of the adhesive polymers, sufficient dimensional stability of the bond is often ensured.

Similar problems also result fundamentally in the case of adhesive bonds which join different materials, examples being wood and paper, wood and textiles, wood and leather, and similar mixed materials.

In order to avoid the problems described with adhesives based on polyvinyl acetate, the use of adhesives based on polyurethanes is on the increase in the aforementioned areas. Polyurethanes, however, have to date likewise been of only limited suitability for use in the abovementioned fields. A problem affecting polyurethanes in general is that they have a not inconsiderable intrinsic coloration.

Although there are polyurethane adhesives which have only a low intrinsic color and are less perceptible in a glue line, such polyurethane adhesives often have other drawbacks. For instance, such adhesives generally have inadequate open times or else combine acceptable open times with an excessive cure time.

DE 44 26 130 A1 relates to reactive hotmelt systems containing isocyanate groups, based on hydroxy polyols and diphenylmethane diisocyanates, with a 2,4'-diphenylmethane diisocyanate content of at least 70% by weight. A problem affecting these compositions is the curing rate, which in practice is often too low.

EP 0 568 425 A1 relates to adhesive compositions based on polyurethane prepolymers, which are obtainable by reacting MDI with polyether polyols. The MDI grades used are not characterized any further with respect to their composition.

DE 199 35 489 A1 relates to an adhesive composition intended for finger joint gluing and containing up to 99.999% by weight of a prepolymer which is obtainable by reacting at least one isocyanate-reactive compound and at least one compound containing an isocyanate. A description is given, for example, of the use of 4,4'-MDI or of mixtures of 2,4'-MDI and 4,4'-MDI, the description, in the case of the use of mixtures, being exclusively of mixtures which contain the two isomers in equal proportions or of mixtures in which the proportion of unsymmetric isomer is predominant. Compositions of this kind, however, have the disadvantages already mentioned above.

There was therefore a need for light-colored, storage stable polyurethane adhesives which cure rapidly within industry-standard processing times and which meet the requirements for water resistance and heat resistance.

In order to prepare PU adhesives with a light color it is necessary to use isocyanates which right from the start possess a light color. The so-called polymeric MDI is therefore suitable for such adhesives, since this compound has a dark intrinsic color. The polyisocyanate grades employed are therefore generally aromatic grades having a functionality of approximately 2.0. A problem affecting such adhesives based on difunctional isocyanates, however, is that their reactivity differs greatly from the reactivity of adhesives manufactured using polymeric MDI. Thus by using polymeric MDI it is possible to prepare prepolymers which exhibit a comparatively long open time with a relatively short curing time, whereas this pair of properties has so far been unavailable for aromatic polyisocyanate grades having a functionality of approximately 2.0.

The last-mentioned properties are, however, a fundamental requirement on the part of the user of such adhesives. In order to open up the applications already described above for polyurethane adhesives too, therefore, light-colored adhesives are required which at one and the same time exhibit the aforementioned properties in respect of processing time, cure time, water resistance and heat resistance. With the PU adhesives prepared to date on the basis of diisocyanates, however, it is found that either the processing time is too short or the cure time lasts too long. It is true that it is possible to influence the reactivity by appropriate adaptation of the formula: for example, by adapting the amount of catalyst used. However, for a given open time, the curing is then substantially slower or, for a given curing time, the open time is considerably shorter.

Additionally it is possible, using MDI grades including a 2,4-MDI fraction, to set satisfactory reactivity and color, but heat and water resistance in adhesives of this kind are often not adequate.

The object was therefore to provide an adhesive which no longer has the aforementioned drawbacks of the prior art. In particular the object underlying the invention was to provide an adhesive which combines a sufficient open time with short curing times. A further object underlying the invention was to provide an adhesive which exhibits the abovementioned properties and additionally has an essentially color-neutral effect on the bondline relative to the materials to be bonded.

It has now been found that PU adhesives which are obtainable from monomeric MDI grades with a 2,4-MDI fraction and polyols having an OH functionality of more than 2.5 have excellent properties in respect of open time, cure time, water resistance and heat resistance. The properties are comparable with those of adhesives based on polymeric MDI, with the color of a PU adhesive comprising monomeric MDI grades with a fraction of 2,4-MDI and polyols having an OH functionality of more than 2.5 being distinctly improved relative to those PU adhesives obtainable using polymeric MDI.

DESCRIPTION OF THE INVENTION

The invention therefore provides a polyurethane prepolymer obtainable by reacting at least one aromatic polyisocyanate having symmetrical substitution in respect of NCO groups and at least one aromatic polyisocyanate having asymmetric substitution in respect of NCO groups, the fraction of aromatic polyisocyanate having symmetrical substitution in respect of NCO groups, or the fraction of mixture of two of more such aromatic polyisocyanates, being higher than the fraction of polyisocyanate having asymmetric substitution in respect of NCO groups or the fraction of mixture of two or more such aromatic polyisocyanates, and at least one polyol having an OH functionality of more than 2.5 and at least one polyol having an OH functionality of less than 2.5.

An adhesive of the invention, then, comprises a reaction product obtainable by reacting the abovementioned components. An inventive reaction product of this kind contains per molecule at least one NCO group, preferably more than one NCO group, for example at least about 1.1 or at least about 1.5 NCO groups. Preferably, however, the number of NCO groups is at least about 2, for example on average at least about 2.1 or more. A reaction product of this kind is also referred to in the context of the present invention as a polyurethane prepolymer. The adhesive obtainable in accordance with the invention from a polyurethane prepolymer of this kind may be composed, in the context of the present invention, exclusively—that is, essentially to an extent of 100% by weight—of one such polyurethane prepolymer or of a mixture of two or more thereof. It is likewise possible in accordance with the invention, however, for an adhesive of the invention to contain one such polyurethane prepolymer or a mixture of two or more thereof in an amount of less than 100% by weight, for example, in an amount of about 30% to about 99% by weight or from about 50% to about 95% by weight, in which case the remainder to 100% by weight consists of additives as described within the text below.

Suitable polyisocyanates for preparing the adhesives of the invention include in principle any desired aromatic isocyanates, provided they meet the abovementioned conditions in respect of the symmetry of the NCO groups.

Preference is given to diisocyanates $Q(NCO)_2$, where Q is an optionally substituted aromatic hydrocarbon radical having 6 to about 15 carbon atoms or an optionally substituted araliphatic hydrocarbon radical having 7 to about 15 carbon atoms. Examples of such diisocyanates are 1,3- and 1,4-diisocyanatobenzene, 2,4- or 2,6-diisocyanatotoluene (2,4- or 2,6-TDI) or a mixture thereof, 2,2'-, 2,4'- or 4,4'-diisocyanatodiphenylmethane (MDI), tetramethylxylylene diisocyanate (TMXDI), p-xylylene diisocyanate, and mixtures of these compounds.

In one preferred embodiment of the present invention an adhesive of the invention is prepared using as polyisocyanate at least one aromatic polyisocyanate having at least two aromatic nuclei.

Suitable isocyanates having at least two aromatic nuclei are in particular the polyisocyanates of biphenyl, of diphenylmethane or of 2,2-diphenylpropane.

Particular preference for preparing an adhesive of the invention is given to the positional isomers of diphenylmethane diisocyanate (MDI).

In another preferred embodiment of the present invention an adhesive of the invention accordingly comprises as at least one aromatic polyisocyanate having symmetrical substitution in respect of NCO groups 4,4'-diphenylmethane diisocyanate or the corresponding carbodiimide derivative or a mixture of two or more thereof.

In another preferred embodiment of the present invention an adhesive of the invention comprises as at least one aromatic polyisocyanate having asymmetric substitution in respect of NCO groups 2,4'-diphenylmethane diisocyanate or the corresponding carbodiimide derivative or a mixture of two or more thereof.

It is of course also possible to use, proportionally as well, the higher polyfunctional polyisocyanates which are known per se in polyurethane chemistry or else modified polyisocyanates known per se, containing for example carbodiimide groups, allophanate groups, isocyanurate groups, urethane groups or biuret groups.

A PU adhesive of the invention develops its excellent properties when it comprises at least one aromatic polyisocyanate having symmetrical substitution in respect of NCO groups, or a mixture of two or more such aromatic polyisocyanates, and at least one aromatic polyisocyanate which has asymmetric substitution in respect of NCO groups, or a mixture of two or more such aromatic polyisocyanates, in a particular weight ratio. Basically it is necessary in accordance with the invention for the fraction of polyisocyanate having symmetrical substitution in respect of NCO groups, or the fraction of mixture of two or more such aromatic polyisocyanates, to be higher than the fraction of polyisocyanate having asymmetric substitution in respect of NCO groups, or the fraction of mixture of two or more such aromatic polyisocyanates.

An adhesive of the invention therefore contains, for example, the aromatic polyisocyanate having symmetrical substitution in respect of NCO groups or a mixture of two or more such aromatic polyisocyanates and the aromatic polyisocyanate having asymmetric substitution in respect of NCO groups or a mixture of two or more such isocyanates in a weight ratio of from approximately 9:1 to approximately 1.5:1, in particular in a ratio of from approximately 6:1 to approximately 2:1 or from approximately 5:1 to approximately 2.5:1 or from approximately 4:1 to approximately 2.8:1.

By the term "polyisocyanates" in the context of the present text are meant isocyanates having an NCO functionality of more than 1.0: for example, an NCO functionality of about 1.5 or about 2, or about 2.5 to about 3.5, about 3 for example, or a higher functionality, of about 4, for example, or about 5 or more. The functionality need not necessarily be expressed by a whole number: non-integral functionalities are also possible, Non-integral functionalities of this kind are present, for example, in mixtures of polyisocyanates of different functionality, the total functionality being determined by way of the total number of molecules present in the isocyanate mixture and the total number of isocyanate groups, relative to the mixture as a whole. This is particularly important when using technical-grade isocyanate mixtures, which generally speaking are not composed 100% of one particular isocyanate type.

The aromatic polyisocyanates which can be used in accordance with the invention and have symmetrical substitution in terms of NCO groups and the aromatic polyisocyanates which can be used in accordance with the invention and have asymmetric substitution in terms of NCO groups preferably possess an average NCO functionality of at least about 1.8, preferably at least about 2 to about 5. In one preferred embodiment of the present invention the average NCO functionality of such polyisocyanates is about 1.9 to about 2.1.

Besides the abovementioned, obligatory polyisocyanate types, a PU adhesive of the invention may further comprise a further isocyanate or a mixture of two or more isocyanates. Suitable isocyanates in this context include, for example, aliphatic or cycloaliphatic isocyanates, preferably polyisocyanates of the general formula $Q(NCO)_2$, where Q is an aliphatic, optionally substituted hydrocarbon radical having 4 to about 12 carbon atoms or an optionally substituted cycloaliphatic hydrocarbon radical having 6 to about 15 carbon atoms. Examples of such diisocyanates are tetramethylene diisocyanate, hexamethylene diisocyanate (HDI), dodecamethylene diisocyanate, dimer fatty acid diisocyanate, 1,4-diisocyanatocyclohexane, 1-isocyanato-3,3,5-trimethyl-5-isocyanatomethylcyclohexane (isophorone diisocyanate, IPDI), 4,4'-diisocyanatodicyclohexylmethyl or 2,2-bis(4,4'-diisocyanatodicyclohexyl)propane, and also mixtures of these compounds. Particularly suitable in addition, as minor constituents, are polymeric polyisocyanates such as oligomeric or polymeric MDI and also its isomers and homologs, or polyisocyanates such as are obtainable by phosgenating technical-grade polyamine mixtures from aniline-formaldehyde condensation. Mixtures of this kind have a functionality for example of from about 2.0 to about 5.0, in particular about 2.5 to about 4.5.

It is naturally also possible to use, proportionally as well, the higher polyfunctional aliphatic or cycloaliphatic polyisocyanates which are known per se in polyurethane chemistry, or else polyisocyanates which are known per se and have been modified, containing for example carbodiimide groups, allophanate groups, isocyanurate groups, urethane groups or biuret groups.

By way of example, as isocyanates which are suitable proportionally in small amounts, mention may be made of hydrogenated MDI ($H_{12}$MDI), 1-methyl-2,4-diiso-cyanato-cyclohexane, 1,6-diisocyanato-2,2,4-trimethyl-hexane, 1,6-diisocyanato-2,4,4-trimethylhexane, chlorinated and brominated diisocyanates, phosphorus-containing diisocyanates, 4,4'-diisocyanato-phenylperfluoroethane, tetramethoxybutane 1,4-diisocyanate, dicyclohexylmethane diisocyanate, cyclohexane 1,4-diisocyanate, ethylene diisocyanate, bisisocyanatoethyl phthalate, and polyisocyanates containing reactive halogen atoms, such as 1-chloromethylphenyl 2,4-diisocyanate, 1-bromomethylphenyl 2,6-diisocyanate, 3,3-bischloromethyl ether 4,4'-diphenyl diisocyanate. Sulfur-containing polyisocyanates are obtained, for example, by reacting 2 mol of hexamethylene diisocyanate with 1 mol of thiodiglycol or dihydroxydihexyl sulfide. Further important diisocyanates are trimethylhexamethylene diisocyanate, 1,4-diisocyanatobutane, 1,12-diisocyanatododecane and dimer fatty acid diusocyanate. Likewise suitable are partially blocked polyisocyanates, which allow the formation of self-crosslinking polyurethanes, e.g., dimeric tolylene diisocyanate, or polyisocyanates reacted fully or partially with, for example, phenols, tertiary butanol, phthalimide, caprolactam.

The proportion of such further isocyanates in the adhesive of the invention is preferably not more than about 10% by weight, for example about 0% to 5% by weight.

In addition to a mixture of polyisocyanates as described above in the present text, an adhesive of the invention further comprises at least one polyol having an OH functionality of more than 2.5. Suitable polyols having an OH functionality of more than 2.5 include in principle all polyols which have an average OH functionality of more than about 2.5. The OH functionality need not necessarily be expressed by a whole number: non-integral OH functionalities are possible as well. Such non-integral OH functionalities are present, for example, in the case of mixtures of polyols of different OH functionality, the overall functionality being determined by way of the total number of molecules present in the polyol mixture and the total number of OH groups, relative to the mixture as a whole.

Suitable polyols having an OH functionality of more than about 2.5 include in principle all polyols or polyol mixtures such as are known to the skilled worker for polyurethane preparation and can normally be employed in the preparation of polyurethanes. For the purposes of the present invention it is possible to use polyols from the group consisting of polyether polyols, polyester polyols, polyether ester polyols, polyalkylene diols, polycarbonates and polyacetals, or a mixture of two or more thereof, each having at least 2, 3, 4 or more OH groups, but preferably not more than about 4 OH groups. Critical for the purposes of the present invention is that the overall mixture has an OH functionality of more than about 2.5 up to preferably about 6, in particular about 2.8 to about 5, for example about 3 to about 4.

In one preferred embodiment of the present invention the adhesives of the invention are prepared using polyols having an average OH functionality which have an average molecular weight of less than about 1000, in particular less than about 800 or less than about 600.

Particularly suitable polyols having an OH functionality of more than 2.5 are for example glycerol, trimethylolpropane, triethylolpropane, pentaerythritol or sugar alcohols, such as sorbitol, mannitol or glucose, or their ether alcohol derivatives, such as are obtainable by ring-opening reaction of the aforementioned alcohols with low molecular weight epoxides having 1 to about 6 carbon atoms, in particular with ethylene oxide or propylene oxide or with mixtures of two or more such low molecular weight epoxides.

In one preferred embodiment of the present invention the polyols having an OH functionality of more 2.5 are glycerol, trimethylolpropane, triethylolpropane or pentaerythritol, especially glycerol, trimethylolpropane or triethylolpropane, and also their polyether derivatives such as are obtainable by ring-opening reaction of the abovementioned compounds with ethylene oxide or propylene oxide or a mixture thereof, randomly or blockwise. Particularly suitable polyols having an OH functionality of more than 2.5 contain at least one ether group and have a molecular weight of less than 500, in particular about 300 to about 450.

In another preferred embodiment of the present invention an adhesive of the invention is prepared using as polyol having an functionality of more than 2.5 a polyol having an OH number of from 250 to about 600, in particular about 300 to 450 mg KOH/g, or a mixture of two or more such polyols.

The polyol having a functionality of more than 2.5, or a mixture of two or more such polyols, is used in the context of the present invention, when preparing the adhesives of the invention, in an amount of from about 0.1% to about 15% by weight, in particular in an amount of from about 0.5% to 10% by weight or about 1% to about 5% by weight, based on the adhesive as a whole.

The inventive use of polyols having a functionality of more than about 2.5 and especially the preferred embodiment, namely the use of corresponding polyols whose molecular weight is less than 1000, leads in the present case to polyurethane prepolymers which in the context of use in adhesives result in compositions which exhibit a distinctly improved initial transverse tensile strength, a distinctly improved heat resistance and an improved water resistance. Moreover there is also in many cases a positive influence on the storage stability of such adhesives.

Besides a polyol having an average OH functionality of more than about 2.5 or a mixture of two or more such polyols, use is made, for preparing a prepolymer of the invention, additionally of at least one further polyol having a functionality of 2.5 or less.

For the purposes of the present invention, as polyols having an average OH functionality of 2.5 or less, it is possible to use polyols selected from the group consisting of polyether polyols, polyester polyols, polyether ester polyols, polyalkylene diols, polycarbonates and polyacetals, or mixtures of two or more thereof.

The polyols which can be used for the purposes of the present invention as polyols having an average OH functionality of 2.5 or less preferably have a molecular weight of more than about 500, in particular about 1000 or more. Polyols of this kind are also referred to in the text below as "polymer polyols".

The stated types of polyols and their preparation are known to the skilled worker from the prior art. Thus, for example, polyester polyols can be prepared by reacting dicarboxylic acids with diols or higher polyols or with a mixture of diols and higher polyols or with an excess of diols or higher polyols or a mixture thereof, and also by ring-opening epoxidized esters, such as epoxidized fatty acid esters, with alcohols.

Suitable polyester polyols are obtainable for example by reacting dicarboxylic acids with diols or higher polyols or with a mixture of diols and higher polyols or with an excess of diols or higher polyols or a mixture thereof, and also by ring-opening of epoxidized esters, such as epoxidized fatty acid esters, with alcohols. Polycaprolactone diols as well, preparable for example from ε-caprolactone and diols or higher polyols, are suitable as polyester polyols. For the purposes of the present invention it is possible, for example, to use polyester polyols which are obtainable from low molecular weight dicarboxylic acids such as succinic acid, glutaric acid, adipic acid, isophthalic acid, terephthalic acid or phthalic acid, or from a mixture of two or more thereof, with an excess of linear or branched, saturated or unsaturated aliphatic diols having about 2 to about 12 carbon atoms. When preparing the polyester polyols it is also possible if desired for there to be a small fraction of alcohols of higher functionality as well, examples of which include glycerol, trimethylolpropane, triethylolpropane, pentaerythritol or sugar alcohols, such as sorbitol, mannitol or glucose, in order to obtain a desired average OH functionality.

Polyester polyols suitable for the purposes of the present invention for preparing the adhesives of the invention are substantially linear and have for example a molecular weight of from about 500 to about 10 000, in particular about 1000 to about 3000, and also an OH number of from about 30 to about 300, for example about 50 to about 200 or about 80 to about 150 mg KOH/g.

Polycaprolactone diols as well, preparable for example from ε-caprolactone and diols or higher polyols, are suitable as polyester polyols. For the purposes of the present invention, for preparing the polyurethanes, it is possible, for example, to use polyester polyols which are obtainable from low molecular weight dicarboxylic acids such as succinic acid, glutaric acid, adipic acid, isophthalic acid, terephthalic acid or phthalic acid, or from a mixture of two or more thereof, with an excess of linear or branched, saturated or unsaturated aliphatic diols having about 2 to about 12 carbon atoms. If desired, when preparing the polyester polyols, it is also possible for there to be a small fraction present of higher polyvalent alcohols, examples of which include glycerol, trimethylolpropane, triethylolpropane, pentaerythritol or sugar alcohols, such as sorbitol, mannitol or glucose. Preferably, however, suitable polyester polyols are substantially linear.

Examples that may be mentioned of suitable polyacetals include the polycondensation products of formaldehyde and diols or polyols or mixtures thereof in the presence of acidic catalysts.

Polyalkylene diols such as polybutadiene diol are commercially available products which are offered in a variety of molecular weights. They are suitable within the context of the present invention, for example, as a polyol component in the preparation of polyurethane prepolymers such as may be used in the dispersions of the invention.

Polyether polyols can be obtained, for example, by homopolymerization, copolymerization or block polymerization of alkylene oxides such as ethylene oxide, propylene oxide or butylene oxide, or mixtures of two or more thereof, or by reaction of polyalkylene glycols with difunctional or trifunctional alcohols or mixtures thereof. Likewise suitable are the polymerized ring-opening products of cyclic ethers, tetrahydrofuran for example, with corresponding alcohols as starter molecules. If ester compounds, oligoesters or polyesters for example, are used as starter molecules, then the products are polyether esters, containing not only ether but also ester groups.

In one preferred embodiment of the present invention use is made of polyether polyols as polyols having an OH functionality of 2.5 or less. These are preferably the alkoxylation products, particularly the ethoxylation or propoxylation products, of difunctional alcohols. Difunctional alcohols used are, in particular, alcohols selected from the group consisting of ethylene glycol, diethylene glycol, triethylene glycol, 1,2-propanediol, dipropylene glycol, the isomeric butanediols, hexanediols, octanediols, and technical-grade mixtures of hydroxy fatty alcohols having 14 to 22 carbon atoms, particularly hydroxystearyl alcohol. If desired, during the alkoxylation reaction, it is also possible for there to be present, in minor amounts, trifunctional alcohols such as trimethylolpropane or glycerol or mixtures of two or more of the stated alcohols.

As well as the abovementioned polyols an adhesive of the invention can also be prepared using, proportionally, linear or branched, saturated or unsaturated aliphatic, monofunctional alcohols, especially methanol, ethanol, the isomers of propanol, of butanol or of hexanol, and also fatty alcohols having about 8 to about 22 carbon atoms, examples being octanol, decanol, dodecanol, tetradecanol, hexadecanol or octadecanol. The stated fatty alcohols are obtainable, for example, by reduction of natural fatty acids and can be used either as pure substances or else in the form of their technical-grade mixtures. Highly suitable, for example, are linear monoalcohols, and particularly those having about 4 to about 18 carbon atoms. Instead of the linear or branched aliphatic alcohols or in a blend with them it is also possible to use monoalkyl polyether alcohols of different molecular weight, preferably in the molecular weight ranges from about 1000 to about 2000.

Likewise possible for use as polyols having an average OH functionality of 2.5 or less are polyhydric alcohols, especially dihydric alcohols, such as are obtainable, for example, by hydrogenating dimeric or oligomeric fatty acids or their esters, castor oil, epoxidized fats or oils ring-opened with $C_{1-4}$ alkyl alcohols, $C_{12-18}$ fatty acid diethanol amides, monoglycerides of aliphatic $C_{8-22}$ fatty acids, polypropylene glycols or polysiloxanes containing terminal OH groups, or mixtures of two or more of said compounds.

Likewise possible for use in the context of the present invention, for preparing the polyurethane prepolymers of the invention, are polyhydric alcohols, especially dihydric alcohols such as ethylene glycol, propylene glycol, propane-1,3-diol, butane-1,4-diol or hexane-1,6-diol. Low molecular weight polyester diols as well, such as succinic, glutaric or adipic bis(hydroxyethyl) esters, or a mixture of two or more thereof, or low molecular weight diols containing ether groups, such as diethylene glycol, triethylene glycol, tetraethylene glycol dipropylene glycol, tripropylene glycol or tetrapropylene glycol can be used as well, proportionally, in the context of the overall mixture of the polyols having an average OH functionality of 2.5 or less.

In a further preferred embodiment of the present invention a polyurethane prepolymer of the invention is prepared using as polyol having an OH functionality of less than 2.5 a polyol having an OH functionality of 2.1 or less.

In another preferred embodiment of the present invention use is made, as polyols having an OH functionality of 2.5 or less, of polymer polyols, especially polyether polyols. Particular preference is given here to polyether polyols which have a molecular weight of at least about 400, but preferably at least about 600, for example, about 800 to about 6000 or about 1000 to about 3000. Suitable in principle for the purposes of the present invention are the above-described polyether polyols formed from $C_2$–$C_8$ alkylene oxides, although it is preferred to use polyether polyols which have been synthesized from $C_3$–$C_5$ alkylene oxides, especially from propylene oxide. Particularly suitable for the purposes of the present invention are the polyether polyols, sold by BASF, of the Lupranol series, an example being Lupranol 1000, or Voranol P 2000 from Dow Chemicals.

Particularly suitable for the purposes of the present invention are, for example, polyurethane prepolymers which have been prepared from about 40% to about 60% by weight, in particular about 45% to about 55% by weight, of a polyalkylene glycol with a functionality of about two, such as a polyethylene glycol or a polypropylene glycol, in particular a polypropylene glycol, the molecular weight Mw of the polyalkylene glycol being for example about 1500 to about 2800, in particular about 1800 to about 2500 or about 1900 to about 2200. Further prepolymers which have been found appropriate include polyurethane prepolymers in whose preparation use has been made of at least one trifunctional polyol having a molecular weight of about 400 to about 500 in an amount of from about 1% to about 8%, for example, about 2% to 6% or about 3% to about 5% by weight.

Particularly suitable in addition are those polyurethane prepolymers in whose preparation the weight fraction of polyisocyanates was about 30% to about 59% by weight, for example, about 38% to about 55% or about 43% to about 50% by weight. The weight ratio of the aromatic polyisocyanates with symmetrical substitution to aromatic polyisocyanates with asymmetrical substitution in such cases is for example about 2:1 to about 4:1, for example about 2.5:1 to about 3.5:1.

Compounds from the aforementioned classes which are suitable for use as polymer polyols may already be present in a molecular weight range which is suitable for use as a polymer polyol. It is also just as possible, however, to use compounds from the abovementioned classes, to prepare the polymer polyols, which have a molecular weight situated below the desired molecular weight or the molecular weight suitable for inventive use as a polymer polyol for the purposes of the present invention. In this case it is possible, in the context of the present invention, to extend such compounds from the abovementioned classes by reacting them with corresponding difunctional compounds until the required or desired molecular weight is attained. Suitability for this purpose is possessed for example by dicarboxylic acids, difunctional epoxy compounds or diisocyanates, diisocyanates being used in one preferred embodiment of the present invention.

In the course of such a chain extension it is also possible if desired for comparatively low molecular weight diols to be present as well. Examples of these are diethylene glycol, 1,2-ethanediol, 1,3-propanediol, 2-methyl-1,3-propanediol, 1,4-butanediol, 1,5-pentanediol, 1,6-hexanediol, 1,7-heptanediol, 1,8-octanediol, 1,9-nonanediol, 1,10-decanediol and also the corresponding higher homologs such as may be formed by stepwise extension of the carbon chain of the stated compounds, and also, for example, 2,2,4-trimethylpentane-1,5-diol, 2,2-dimethylpropane-1,3-diol, 1,4-dimethylolcyclohexane, 1,4-diethanolcyclohexane, 2-methyl-2-butyl-1,3-propanediol, 2,2-dimethyl-1,4-butanediol, 1,4-dimethylolcyclohexane, neopentyl glycol hydroxypivalate, diethylene glycol, triethylene glycol, methyldiethanolamine or aromatic-aliphatic or aromatic-cycloaliphatic diols having 8 to about 30 carbon atoms, it being possible as aromatic structures to use heterocyclic ring systems or, preferably, isocyclic ring systems such as naphthalene derivatives or, in particular, benzene derivatives such as bisphenol A. Also suitable are polyols from the group of the carbohydrates, examples being monosaccharides or polysaccharides.

In the course of such a chain extension it is also possible if desired for low molecular weight amino compounds to be present. Examples of compounds suitable for this purpose are primary amino compounds having two to about 20, for example, two to about 12 carbon atoms such as ethylamine, n-propylamine, isopropylamine, n-propylamine, sec-propylamine, tert-butylamine, 1-aminoisobutane, substituted amines having two to about 20 carbon atoms such as 2-(N,N-dimethylamino)-1-aminoethane, amino mercaptans such as 1-amino-2-mercaptoethane, aliphatic amino alcohols having 2 to about 20, preferably 2 to about 12 carbon atoms, examples being methanolamine, 1-amino-3,3-dimethylpentan-5-ol, 2-aminohexane-2',2"-diethanolamine, 1-amino-2,5-dimethylcyclohexan-4-ol-2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclohexanol, 1-amino-1-cyclopentanemethanol, 2-amino-2-ethyl-1,3-propanediol, aromatic-aliphatic or aromatic-cycloaliphatic amino alcohols having 6 to about 20 carbon atoms, in which case as aromatic structures heterocyclic ring systems or, preferably, isocyclic ring systems such as naphthalene derivatives or, in particular, benzene derivatives such as 2-aminobenzyl alcohol, 3-(hydroxymethyl)aniline, 2-amino-3-phenyl-1-propanol, 2-amino-1-phenylethanol, 2-phenylglycinol or 2-amino-1-phenyl-1,3-propanediol or mixtures of two or more such compounds.

The polymer polyols are prepared in accordance with the usual rules of organic polymer chemistry. If the polymer polyol used is a polyester, polyether, polycarbonate, polyacetal or other compound which can be used as a polymer polyol, then it is prepared by customary methods of polymer chemistry that are known to the skilled worker. If a variety of the aforementioned compounds which can be used as polymer polyols are associated with one another, owing to an inadequate molecular weight on the part of the individual compounds, this takes place, as a function of the difunctional compound used for chain extension, likewise in accordance with the customary rules, known in organic chemistry, for the respective functional groups.

Instead of or together with the abovementioned alcohols it is also possible to use polyfunctional primary or secondary amines as chain building blocks, and also amino carboxylic acids and low molecular weight protein compounds. Specific compounds that may be mentioned include the following: polyoxyethylene, polyoxypropylene and polyoxybutylenediamine compounds—and specifically not only the homopolymers but also the copolymers based on these monomers—with molecular weights of up to 5000 (Jeffamines) and/or glycine, alanine; valine, leucine, cysteine, cystine, aspartic acid, glutamic acid, tyrosine, tryptophan, $\epsilon$-aminocaproic acid, 11-aminoundecanoic acid, 4-aminobutyric acid, monoaminonaphthoic and diaminonaphthoic acid. The fraction of these substances ought to amount to less than 20 mol %, preferably less than about 10 mol %, relative to the polyols used for preparing the adhesive of the invention.

In order to limit the functionality of polyisocyanate prepolymers present in a polyurethane prepolymer of the invention it is possible for up to 30% of the NCO groups to be reacted with monofunctional substances, in particular with monoalcohols, monoamines and monocarboxylic acids. A corresponding possibility for limiting functionality is described for example in EP 0 746 577.

A polyisocyanate prepolymer used as part of an adhesive of the invention may if desired also be prepared using a tertiary amine having at least one functional group for incorporation into the polymer chain, in which case an amine of this kind is incorporated into the polymer chain.

The number of functional groups of a tertiary amine of this kind is preferably 2. However, 3 functional groups or 1 functional group per tertiary amine are further possibilities.

Suitable tertiary amines contain, for example, as functional groups —OH, —SH, —COOH, —NCO, —NH$_2$ or —NHR or a mixture of two or more thereof, where R is an alkyl group having 1 to 25 carbon atoms. Preference is given to using amines containing OH groups. Examples of suitable compounds include N,N-dimethylethanolamine, N,N-dimethyldiaminoethane, N-methyldiethanolamine, N,N-dimethyl-2-(2-dimethylaminoethoxy)ethanol, N,N,N-tri-methyl-N-hydroxyethyldiaminoethanebisaminoethyl ether, N,N-bis(3-dimethylaminopropyl)-N-isopropanolamine, tetra-methyliminobispropylamine or N-(3-dimethylaminopropyl)-N,N-diisopropanolamine or mixtures of two or more thereof.

Suitable tertiary amines may be used during the preparation of the polyisocyanate prepolymers present in the 1K PU adhesive of the invention in an amount of from 0 to 10 g, for example, from 0.1 to 5 g or from about 0.5 to about 3 g per 100 g of prepolymer.

A polyurethane prepolymer suitable for use in an adhesive of the invention has a molecular weight of at least about 500 but preferably at least about 1000. Particularly suitable polyisocyanate prepolymers are those having a molecular weight of at least about 2000, for example, at least about 2500, at least about 3000, at least about 3500 or at least about 4000, for example, at least about 6000. The upper limit on the molecular weight is determined essentially only by the handling properties of the adhesive; the adhesive must overall be at least spreadable, and must preferably be pastelike or liquid. This can be achieved where appropriate through the use of plasticizers or solvents; in one preferred embodiment of the present invention, however, the adhesives of the invention contain no solvents.

It is also envisaged in accordance with the invention to use the prepolymers of the invention in an adhesive which can be used as a hotmelt adhesive. In that case a polyurethane prepolymer of the invention may have, for example, a molecular weight which leads to polymers which are solid or extremely viscous at room temperature. What is decisive in this case is that an adhesive of the invention containing at least one polyurethane prepolymer of the invention has an appropriate viscosity at the processing temperature, in other words for example at a temperature of from about 40 to about 200° C.

It is therefore preferred in accordance with the invention if a polyisocyanate prepolymer suitable for use in an adhesive of the invention that is used, for example, at customary ambient temperatures of from about 0 to about 40° C. has a Brookfield viscosity in a range from about 500 to about 100 000 mPas, for example, about 1000 to about 20 000 mPas or about 5000 to about 15 000 mPas (measured using Brookfield Digital Viscometer RTVDV-II "spindle 6" at 23° C., viscosity measurement in accordance with EN ISO 2555).

Besides at least one polyisocyanate prepolymer prepared in accordance with the invention it is possible for a polyurethane adhesive of the invention to include at least one catalyst. Examples of suitable catalysts include tertiary amines which are not incorporated into the prepolymer chain, such as diazabicyclooctane (Dabco), triethylamine, dimethylbenzylamine (Desmorapid DB, Bayer), bisdimethylaminoethyl ether (Calalyst A I, UCC), tetramethylguanidine, bisdimethylaminomethylphenol, 2,2'-dimorpholinodiethyl ether, 2-(2-dimethyl-aminoethoxy)ethanol, 2-dimethylaminoethyl 3-dimethyl-aminopropyl ether, bis(2-dimethylaminoethyl)ether, N,N-dimethylpiperazine, N-(2-hydroxyethoxyethyl)-2-aza-norboranes, Tacat DP-914 (Texaco Chemical), Jeffcat™, N,N,N,N-tetramethylbutane-1,3-diamine, N,N,N,N-tetra-methylpropane-1,3-diamine or N,N,N,N-tetramethylhexane-1,6-diamine or mixtures of two or more thereof.

The catalysts may also be present in oligomerized or polymerized form, e.g., as N-methylated polyethylenimine.

Further suitable catalysts include 1-methylimidazole, 2-methyl-1-vinylimidazole, 1-allylimidazole, 1-phenylimidazole, 1,2,4,5-tetramethylimidazole, 1-(3-aminopropyl) imidazole, pyrimidazole, 4-dimethylaminopyridine, 4-pyrrolidinopyridine, 4-morpholinopyridine, 4-methylpyridine or N-dodecyl-2-methylimidazole or mixtures of two or more thereof.

As well as or instead of the tertiary amines it is also possible for organometallic compounds such as organotin compounds of carboxylic acids, strong bases such as alkali metal hydroxides, alkoxides and phenoxides, e.g., di-n- octyltin mercaptide, dibutyltin maleate, diacetate, dilaurate, dichloride and bisdodecylmercaptide, tin(II) acetate, ethylhexoate and diethylhexoate or lead phenylethyldithiocarbamate, to be present in a PU adhesive of the invention.

In one preferred embodiment of the present invention a PU adhesive of the invention comprises as catalysts 2,2'-dimorpholinodiethyl ether, 2-(2-dimethyl-aminoethoxy) ethanol, 2-dimethylaminoethyl 3-dimethyl-aminopropyl ether, bis(2-dimethylaminoethyl)ether, N,N-dimethylpiperazine, N-(2-hydroxyethoxyethyl)-2-aza-norboranes, Tacat DP-914 (Texaco Chemical), Jeffcat™, N,N,N,N-tetramethylbutane-1,3-diamine, N,N,N,N-tetra-methylpropane-1,3-diamine or N,N,N,N-tetramethylhexane-1,6-diamine or mixtures of two or more thereof, especially 2,2'-dimorpholinodiethyl ether.

Besides one or more polyisocyanate prepolymers and one or more catalysts, a PU adhesive of the invention may further comprise at least one aminopolyether polyol which has from 2 to 4, preferably 3, OH groups and has a molecular ratio of ether groups to amino nitrogen atoms of from about 7 to about 30, in particular about 9 to about 25 or about 11 to about 20. The term "comprise" with regard to the aminopolyether polyol is to be interpreted to the effect that the aminopolyether polyol or a mixture of two or more suitable aminopolyether polyols is present in a form incorporated into the polymer chain of the polyisocyanate prepolymer and is counted as part of the polymer polyols.

In one preferred embodiment of the present invention aminopolyether polyols used as part of the polyurethane prepolymers of the invention are polyols containing only one amino nitrogen per molecule.

Suitable aminopolyether polyols therefore include, in principle, all aminopolyether polyols such as may be prepared, for example, by reacting a tertiary amine carrying 3 OH groups with alkylene oxides under appropriate conditions: for example, under the reaction conditions described above in connection with the preparation of polyether polyols. In one preferred embodiment of the present invention use is made, as part of a polyurethane prepolymer of the invention, of aminopolyether polyols which are obtainable by reacting trialkanolamines of the general formula N(—R$^1$—OH)$_3$, in which the radicals R$^1$ each independently of one another are a linear or branched, saturated or unsaturated alkylene radical having 1 to 22, especially 2 to 5, carbon atoms.

Particularly suitable in this context are aminopolyether polyols based on trialkanolamines of the general formula N(—R$^1$—OH)$_3$ in which the radicals R$^1$ each independently of one another are linear, saturated alkylene radicals having 2 to 4 carbon atoms (ethylene, n-propylene or n-butylene).

The aminopolyether polyols which can be used in accordance with the invention contain ether groups, the overall ratio of the ether groups (R—O—R) to amino nitrogen atoms per molecule in an aminopolyether polyol being about 7 to about 30, in particular about 9 to about 25 or about 11 to about 20 or about 11 to about 15, for example, about 12 to about 19 or about 13 to about 18 or about 14 to about 17 or about 15 to about 16. The ether groups are produced for example by reacting a trialkanolamine with cyclic ethers. In that case it is preferred to use cyclic ethers having 2 to about 6 carbon atoms, especially alkylene oxides having 2 to about 4 carbon atoms, ethylene oxide or propylene oxide for example.

An aminopolyether polyol which can be used for the purposes of the present invention may contain ether groups which originate from reaction with only one kind of cyclic ethers. Within the context of the present invention it is also possible, however, to use aminopolyether polyols whose ether groups originate from reaction with two or more kinds of cyclic ethers. Such a reaction may have taken place alternatingly, blockwise or randomly.

Particular preference for the purposes of the present invention is given to aminopolyether polyols such as may be obtained by reacting a trialkanolamine, in particular by reacting triethanolamine or tripropanolamine, with ethylene oxide or propylene oxide or a mixture thereof.

For the adhesives of the invention it has proven advantageous if the alkali metal ion content of an adhesive of the invention is below a certain limit: for example, below about 20 ppm, preferably below about 10 ppm, below about 5 ppm for example, based on the polyisocyanate prepolymer or the polyisocyanate prepolymers.

The fraction of catalyst or mixture of two or more catalysts in the adhesive of the invention is about 0.01% to about 6% by weight, for example, about 0.1% to about 2% by weight, the amount of catalyst being variable in accordance with the application requirement.

The fraction of aminopolyether polyol or aminopolyether polyols in the adhesive of the invention is about 0.2% to about 4% by weight, in particular about 0.5% to about 2% by weight.

The adhesive of the invention may further comprise customary additives as well, such as, for example, fillers such as chalk, mineral silicates, such as phyllosilicates, plastics, hollow beads, silicas, filler fibers, pigments, defoamers, adhesion promoters, plasticizers, ageing inhibitors and $CO_2$-absorbing or -adsorbing additives, e.g., molecular sieves and silica gel. It is also possible, however, to add substances which react chemically with the $CO_2$, an example being CaO.

In one preferred embodiment of the present invention an adhesive of the invention comprises synthetic or natural fibers, especially short cut fibers in an amount of from about 0.1% to about 5% by weight, for example, about 0.2% to about 2% by weight.

The further antioxidants or stabilizers which can be used as additives in an adhesive of the invention in the context of the present invention include high molecular weight ($M_n$) sterically hindered phenols, polyfunctional phenols and sulfur- and phosphorus-containing phenols. Examples of phenols which can be used as additives in the context of the invention include 1,3,5-trimethyl-2,4,6-tris(3,5-di-tert-butyl-4-hydroxybenzyl)benzene; pentaerythrityl tetrakis-3-(3,5-di-tert-butyl-4-hydroxyphenyl)propionate; n-octadecyl 3,5-di-tert-butyl-4-hydroxyphenyl)propionate; 4,4-met-hylenebis(2,6-di-tert-butylphenol); 4,4-thiobis(6-tert-butyl-o-cresol); 2,6-di-tert-butylphenol; 6-(4-hydrox-yphenoxy)-2,4-bis(n-octylthio)-1,3,5-triazine; dinoc-tadecyl 3,5-di-tert-butyl-4-hydroxybenzylphosphonate; 2-(n-octylthio)ethyl-3,5-di-tert-butyl-4-hydroxybenzoate; and sorbityl hexa[3-(3,5-di-tert-butyl-4-hydroxyphenyl)propionate].

Suitable photostabilizers are for example those available commercially under the name Thinuvin® (manufacturer: Ciba Geigy).

The adhesive of the invention has a viscosity at processing temperature of from about 500 to about 100 000 mPas, for example, about 1000 to about 20 000 mPas or about 2000 to about 15 000 mPas. There is only insubstantial change in the viscosity on storage; in other words, the adhesive remains useable. Specifically the viscosity changes over the course of 3 months at 40° C. in the absence of moisture at most in a range of maximally +250%, in particular of maximally +100%, relative to the initial viscosity. The viscosity is determined as indicated later on below, using a Brookfield viscometer.

The adhesive of the invention contains NCO groups in amounts such that following application of the adhesive to a substrate there is a noticeable solidification. Advantageously the NCO content ought to be situated within a range from about 1 to about 20 g NCO per 100 g adhesive, in particular about 5 to about 19 or about 3 to about 15 or about 8 to about 13, for example, about 10 to about 12 g/100 g adhesive (% by weight). The NCO content is determined in accordance with DIN EN 1242 (corresponding to BS EN 1242).

The polyisocyanate prepolymer present in an adhesive of the invention can be prepared in either a single-stage or a multistage process, observing the process conditions which are generally customary and known to the skilled worker for the preparation of NCO prepolymers.

In the case of the preferred single-stage process, for example, first all of the starting materials are mixed, where appropriate in the presence of an organic solvent and preferably under inert conditions, such as under inert gas, with a water content of less than about 0.5% by weight, preferably less than about 0.1% or about 0.05% by weight. The mixture is heated at about 40 to about 110° C., in particular at about 60 to about 98° C., for a period of from about 0.1 to about 3 hours, in particular about 0.5 to about 2 hours. The reaction time for preparing the polyisocyanate prepolymer or the adhesive as a whole can be shortened by adding catalysts. Examples of suitable catalysts are the abovementioned tertiary amines or organometallic catalysts. By way of example these are triethylamine, dimethylbenzylamine, bis-dimethylaminoethyl ether and bismethylaminomethylphenol. Particularly suitable for preparing the polyisocyanate prepolymer are, for example, 1-methylimidazole, 1-methyl-1-vinylimidazole, 1-allylimidazole, 1-phenylimidazole, 1,2,4,5-tetramethylimidazole, 1-(3-aminopropyl)imidazole, pyrimidazole, 4-dimethylaminopyridine (DMAP), 4-pyrrolidinopyridine, 4-morpholinopyridine and 4-methylpyridine or organometallic compounds such as iron, titanium or tin compounds, particularly the 1,3-dicarbonyl compounds of iron or of divalent or tetravalent tin, particularly the Sn(II) carboxylates and/or the dialkyl-Sn(IV) dicarboxylates or the corresponding dialkoxylates, examples being dibutyltin dilaurate, dibutyltin diacetate, dioctyltin diacetate, dibutyltin maleate, tin(II) octoate, tin(II) phenoxide or the acetylacetonates of divalent or tetravalent tin.

In principle the sequence of addition of the individual components is arbitrary. Thus, for example, the polyols can be introduced initially and then the poly-isocyanates added.

The present invention accordingly further provides a process for preparing a polyurethane prepolymer of the invention, in which at least one aromatic poly-isocyanate having symmetrical substitution in respect of NCO groups and at least one aromatic polyisocyanate having asymmetrical substitution in respect of NCO groups and at least one polyol having an OH functionality of more than 2.5 and at least one polyol having an OH functionality of 2.5 or less are reacted with one another, the fraction of aromatic polyisocyanate having symmetrical substitution in respect of NCO groups or the fraction of mixture of two or more such aromatic polyisocyanates being higher than the fraction of polyisocyanate having asymmetric substitution in respect of NCO groups.

In one preferred embodiment of the present invention, in the preparation of the adhesive of the invention, the polyols are mixed first and then the isocyanates are added in the form of a mixture.

An adhesive of the invention has a neutral, light color and can be used universally, such as on porous surfaces, for example. The glue line is much less apparent than in the case of adhesives based on polymeric MDI which are comparable in terms of their adhesive properties.

These advantages apply in particular for the challenging shape gluing applications, where up to 20 or more joints may be present in one shaped part. Since long processing times are a prerequisite for the adhesive specifically in the case of shape gluing, and since rapid cure times are desirable from an economic viewpoint, the adhesive of the invention with advantages described above is particularly suitable for shape gluing applications of this kind.

The present invention accordingly additionally provides for the use of an adhesive of the invention or of an adhesive prepared by a process of the invention for adhesively bonding porous materials such as wood, wood materials, paper, board, leather, textiles, fiber webs, natural fibers, synthetic fibers or plastics.

The invention is illustrated below by means of examples.

EXAMPLES

For the purpose of examining the efficiency of the adhesive of the invention the following adhesive formulas were prepared (figures in % by weight):

| Example C1: comparative example | |
|---|---|
| Lupranol 1000 | 59.5% |
| Desmodur VKS 20 F | 40.5% |
| Example C2: comparative example | |
| Lupranol 1000 | 61.0% |
| Desmodur VKS 20 F | 39.0% |
| Example C3: comparative example | |
| Lupranol 1000 | 59.5 |
| Suprasec 2385 | 40.5 |
| Example C4: comparative example | |
| Lupranol 1000 | 48.0 |
| Voranol CP 450 | 4.0 |
| Lupranat MIS | 48.0 |
| Example B1: inventive | |
| Lupranol 1000 | 46.0 |
| Voranol CP 450 | 4.0 |
| Suprasec 2385 | 50.0 |
| Example B2: inventive | |
| Lupranol 1000 | 47.8 |
| Voranol CP 450 | 4.0 |
| Suprasec 2004 | 48.2 |

Preparation Instruction for the Prepolymers C1 to C4 and B1, B2

For the preparation of the prepolymers, for the purpose of comparability, the NCO/OH ratio was calculated for all examples at about 5.0 to 1. Additionally, per 100 pbw of prepolymer, 0.05 pbw of DBTL 0.50 pbw of DMDEE 0.05 pbw of benzyl chloride were added.

The polyols used were dewatered at 70° C. and at 15 mbar in an evacuable, heatable and coolable PC laboratory dissolver at 100 rpm. To check the water content a Karl-Fischer water determination followed. Following dewatering the polyol mixture ought to contain less than 200 ppm of water. After the mixture had been cooled to 30° C. the isocyanate was added with stirring and the mixture was heated further to 75° C. under atmospheric pressure at 200 rpm. Then, with stirring, the catalyst, DBTL, was added and prepolymerization was continued under atmospheric pressure at 200 rpm. Exothermic reaction caused an increase in temperature to about 95° C. Care was taken to ensure that a temperature of 95° C. was not exceeded, with cooling if necessary. Prepolymerization was then carried out for a further 30 minutes without heating, the temperature not falling below 85° C. When the theoretical NCO number of ±0.4% had been reached the batch was cooled to room temperature under the same stirring conditions, venting was carried out and the foam catalyst, DMDEE, and, for stabilization, benzyl chloride were added. This was followed by subsequent stirring for 15 minutes at 15 mbar. Care should be taken to ensure that no moisture gets into the adhesive during preparation of the prepolymer. The entire preparation took place under inert gas. The vacuum phases were likewise followed by venting with inert gas.

Sources, Specifications

Lupranol 1000, BASF, OHN about 55, molecular weight about 2000, polypropylene glycol Voranol CP 450, Brenntag, OHN about 380, molecular weight about 440, polyether triol, functionality about 3.0

Desmodur M 44, Bayer, 4,4-diphenylmethane diisocyanate, NCO content about 33.0%, functionality about 2.0 2,4-MDI content<2.0%, Desmodur VKS 20 F, Bayer, 4,4-diphenylmethane diisocyanate, NCO content about 30.5%, functionality about 2.7 2,4-MDI content about 3.4%

Suprasec 2385, ICI, 4,4-diphenylmethane diisocyanate, NCO content about 30.9%, functionality about 2.0 2,4-MDI content about 17.5%

Suprasec 2004, ICI, 4,4-diphenylmethane diisocyanate, NCO content about 32.8%, functionality about 2.0 2,4-MDI content about 26.1%

Lupranat MIS, BASF, 4,4-diphenylmethane diisocyanate, NCO content about 33.0%, functionality about 2.0 2,4-MDI content about 47.8%

DBTL, Brenntag, organotin compound, dibutylditin laurate

Dabco-DMDEE, Air Products, 2,2'-dimorpholinodiethyl ether

Benzyl chloride, Bayer, 99.5%

Properties of the Adhesives

TABLE 1

| | Color | | | | | |
|---|---|---|---|---|---|---|
| | C1 | C2 | C3 | C4 | B1 | B2 |
| Color | Brown | opaque | pale yellowish | pale yellowish | pale yellowish | pale yellowish |

TABLE 2

| | Viscosities | | | | | |
|---|---|---|---|---|---|---|
| | C1 | C2 | C3 | C4 | B1 | B2 |
| Viscosity | 28 500 | 5200 | 7700 | 4500 | 9700 | 5300 |

TABLE 3

| | Open time | | | | | |
|---|---|---|---|---|---|---|
| | C1 | C2 | C3 | C4 | B1 | B2 |
| Open time | 10 | 5 | 13 | 14 | 10 | 12 |

TABLE 4

| | Initial transverse tensile strength | | | | | |
|---|---|---|---|---|---|---|
| | C1 | C2 | C3 | C4 | B1 | B2 |
| ITTS | 3800 | 3900 | 3700 | 1600 | 4000 | 3800 |

TABLE 5

| | Heat resistance | | | | | |
|---|---|---|---|---|---|---|
| | C1 | C2 | C3 | C4 | B1 | B2 |
| Heat stability | 9.2 | 7.1 | 7.4 | 8.8 | 9.9 | 9.1 |

TABLE 6

| | Water resistance | | | | | |
|---|---|---|---|---|---|---|
| | C1 | C2 | C3 | C4 | B1 | B2 |
| Water resistance | 5.8 | 4.7 | 3.9 | 3.2 | 6.5 | 5.9 |

TABLE 7

| | NCO contents | | | | | |
|---|---|---|---|---|---|---|
| | C1 | C2 | C3 | C4 | B1 | B2 |
| NCO content | 10.2 | 10.3 | 10.0 | 12.5 | 12.3 | 12.8 |

TABLE 8

| | Storage stability | | | | | |
|---|---|---|---|---|---|---|
| | C1 | C2 | C3 | C4 | B1 | B2 |
| Viscosity | 44 000 | 7800 | 11 100 | 7800 | 14 700 | 10 200 |

Test Methods

Determination of Isocyanate Content (NCO Content)

In accordance with EN 1242 or DIN EN 1242 and also BSEN 1242, report in % NCO.

Determination of Viscosity

Brookfield Digital Viscometer RTVDV-II, spindle 6, at 23° C., viscosity measurement in accordance with EN ISO 2555, report in mPas Assay for MDI Positional Isomerism (2,4-MDI Content)

Gas Chromatography

Determination of Open Time

Measurement is carried out on conditioned, unsteamed solid beech (Fagus sylvatica), stored at 23° C. and 50% relative atmospheric humidity, with a wood moisture content of 8–9% and an adhesive application of 200N.

For the measurement the adhesive under test, stored at 23° C., is applied using a spiral-wound coating bar under constant climatic conditions at 23° C. and 50% relative atmospheric humidity (RH). A record is made of the time at which the adhesive no longer flows. For that purpose a beechwood rod 1 cm wide and 10 cm long is inserted into the bed of adhesive at 30-second intervals and loaded with a weight of 2 kg for 3 seconds. After that time the beechwood rod is lifted and the adhesive surfaces are assessed. If the adhesive still runs, the open time has not yet been exceeded. Only when the adhesive no longer runs and begins to form strings has the open time been exceeded. A determination is made of the time at which the adhesive still runs.

Report: Time in Minutes

Determination of the Initial Transverse Tensile Strength (ITTS)

Testing takes place on butt-glued solid, unsteamed and planed beech (Fagus sylvatica) stored at 23° C. and at 50% relative atmospheric humidity and with a wood moisture content of 8 to 9%. For this purpose 5 pieces of beechwood with the dimensions length=20 cm, width=4 cm and thickness=2 cm are glued to one another by their narrow sides so as to form a total surface area of 20 times 20 cm. The individual pieces of beechwood are each cut off to a depth of 24 mm at the head end and obliquely at an angle of 20°, so that when the individual parts are glued together an isosceles wedge section with a total angle between the two legs of 40° is formed which has a depth of 24 mm and a wide shoulder of 18.5 mm. Thus at each joint a wedge section 2 cm wide is produced.

The wooden test pieces must be conditioned at 23° C. and 50% RH under constant conditions for at least 2 weeks prior to testing in order to ensure an equilibrium wood moisture content of between 8 and 9%. The wood pieces are bonded under defined climatic conditions at 23° C. and 50% RH, and the adhesive itself should likewise have a temperature of 23° C. Adhesive application takes place to one side using a 200 μm spiral-wound coating bar. The parts are joined after a venting time of 1 minute following application of the adhesive. A pressure of between 0.6 and 0.7 NImm$^2$ is applied. After a pressing time of 30 minutes the clamped parts are unclamped and tested immediately thereafter. The measurement itself takes place on a mechanical destructive tension machine fitted with a force diversion mechanism, with which the testing machine can be converted from a tension testing machine to a pressure testing machine. To split the test specimens in the bond area a solid, polished aluminum wedge with a flank angle of 20° was mounted on the force transducer, this wedge fitting exactly into the notch in the test specimens without contacting the flank base. At a rate of advance of 50 mm/min the aluminum wedge was then run into each notch in the wooden test specimens, at a constant speed, and the force in N required to split the joint was measured. The four joints are split at intervals of 10 seconds. The arithmetic mean is then calculated from the four values measured on the four adhesive joints.

Report: Force in N

Test Specimen Production for DIN EN 12765 and Heat Resistance

DIN EN 205 of October 1991, Determination of bond strength of longitudinal bonds in tensile testing Determination of Heat Resistance The test adhesive is used to produce test specimens in accordance with DIN EN 205. Subsequently these test specimens are tested with heating in a tensile shear test based on EN 12765 C1, storage sequence 1. In deviation from EN 12765 C1 the test specimen is pulled apart not at room temperature but with heating. For that purpose the test specimens are stored in a forced-air drying cabinet at 80° C.+−1° C. for 1 h. After the test specimen has been removed it must be pulled apart within 10 seconds in a destructive tension machine in order to rule out heat losses. The rate of advance of the destructive tension machine is 50 mm/min.

Report: Force in N/mm$^2$

Determination of the Water Resistance in Accordance with DIN EN 12765 September 2001 (EN 12765:2001)

Classification of thermoset wood adhesives for nonload-bearing applications, tested performance group C4

Report: Force in N/mm$^2$

Testing for Storage Stability

The test adhesive is stored for a period of three months in a 250 ml glass bottle with a water-vapor-impermeable seal at 40° C.+−1° C. After this time the viscosity is examined.

Storage stability is satisfactory if the final viscosity exceeds by a factor of 2.5 or less the value for the initial viscosity at the beginning of the test.

Equipment

PC laboratory dissolver, model LDV 1 from PC Laborsystem GmbH, CH 4312 Magden,

Destructive tension machine, mechanical, machine type ETZW 1162, 20 KN, Zwick

Destructive tension machine, electronic, model 4302, 10 KN, Instron

Evaluation:

From table 1 it is apparent that examples B1 and B2 are approximately neutral in color as compared with example C1. From table 3 it is evident that the open times of examples B1 and B2 are the same or longer than in comparative example C1, while the transverse tensile strength, which can be seen in table 4, is at the same level as in example C1. Example C2, in contrast, shows a much shorter open time.

In table 5 the heat resistance values found for examples B1 and B2 were the same as for example C1. Examples C2 and C3, in contrast, have a far lower heat resistance, owing to their linear structure.

The water resistance, which can be seen in table 6, shows that example B1 and B2 have equal or better values than comparative example C1. The water resistance in examples C3 and C4 is much lower.

Other Details

The inert gas used was anhydrous nitrogen.

Except for the testing of the ITTS, all other destructive tensile tests were carried out on an electronic destructive tension machine.

What is claimed is:

1. A polyurethane prepolymer comprising at least one aromatic polyisocyanate having symmetrical substitution of NCO groups and at least one aromatic polyisocyanate having asymmetric substitution of NCO groups in a weight ratio of 6:1 to 1.5:1, and at least one polyol having an OH functionality of more than 2.5 and an OH number of 250 to 600 and at least one polyol having an OH functionality of less than 2.5.

2. The prepolymer of claim 1, comprising 4,4'-diphenyl-methane diisocyanate.

3. The prepolymer of claim 1, comprising 2,4'-diphenyl-methane diisocyanate.

4. The prepolymer of claim 1, comprising as the polyol having an OH functionality of more than 2.5 a polyol having a molecular weight of 1000 or less.

5. The prepolymer of claim 1, comprising the polyol having a functionality of more than 2.5 in an amount of from 0.5% to 10% by weight, based on the total amount of polyurethane prepolymer.

6. The prepolymer of claim 1, comprising as the polyol having an OH functionality of less than 2.5 a polyol having a molecular weight of 500 or more.

7. An adhesive comprising the polyurethane prepolymer of claim 1.

8. A process for preparing a polyurethane prepolymer, in which at least one aromatic polyisocyanate having symmetrical substitution of NCO groups and at least one aromatic polyisocyanate having asymmetric substitution of NOO groups in a weight ratio of 6:1 to 1.5:1 and at least one polyol having an OH functionality of more than 2.5 and an OH number of 250 to 600 and at least one polyol having an OH functionality of 2.5 or less are reacted with one another.

9. The process of claim 8, wherein first the polyols are mixed and then the isocyanates are added in the form of a mixture.

* * * * *

UNITED STATES PATENT AND TRADEMARK OFFICE
CERTIFICATE OF CORRECTION

| | |
|---|---|
| PATENT NO. | : 7,199,207 B2 |
| APPLICATION NO. | : 10/988405 |
| DATED | : April 3, 2007 |
| INVENTOR(S) | : Gruenewaelder et al. |

It is certified that error appears in the above-identified patent and that said Letters Patent is hereby corrected as shown below:

Title page, (56) References Cited, OTHER PUBLICATIONS, line 12, delete "tap" and insert therefor --lap--.

Column 22, line 7, delete "NOO" and insert therefor --NCO--.

Signed and Sealed this

Twenty-sixth Day of June, 2007

JON W. DUDAS
*Director of the United States Patent and Trademark Office*